(12) United States Patent
Krymski

(10) Patent No.: US 10,057,523 B1
(45) Date of Patent: Aug. 21, 2018

(54) IMAGE SENSORS AND METHODS WITH MULTIPLE PHASE-LOCKED LOOPS AND SERIALIZERS

(71) Applicant: Alexander Krymski, Sunny Isles Beach, FL (US)

(72) Inventor: Alexander Krymski, Sunny Isles Beach, FL (US)

( * ) Notice: Subject to any disclaimer, the term of this patent is extended or adjusted under 35 U.S.C. 154(b) by 0 days.

(21) Appl. No.: 15/431,567

(22) Filed: Feb. 13, 2017

(51) Int. Cl.
*H04N 5/376* (2011.01)
*H04N 5/378* (2011.01)
*H04N 5/907* (2006.01)

(52) U.S. Cl.
CPC ........... *H04N 5/3765* (2013.01); *H04N 5/378* (2013.01); *H04N 5/907* (2013.01)

(58) Field of Classification Search
CPC ....... H04N 5/3765; H04N 5/378; H04N 5/907
See application file for complete search history.

(56) References Cited

U.S. PATENT DOCUMENTS

| | | | |
|---|---|---|---|
| 5,040,144 A | 8/1991 | Pelley et al. | |
| 5,581,503 A | 12/1996 | Matsubara et al. | |
| 5,866,924 A | 2/1999 | Zhu | |
| 6,182,184 B1 | 1/2001 | Farmwald et al. | |
| 6,411,146 B1 | 6/2002 | Kuo | |
| 6,515,271 B1 * | 2/2003 | Shimizu | H04N 5/23241 250/208.1 |
| 6,763,513 B1 | 7/2004 | Chang et al. | |
| 6,791,377 B2 | 9/2004 | Ilchmann et al. | |
| 6,937,173 B2 | 8/2005 | Kim | |
| 6,975,141 B2 | 12/2005 | Mueller et al. | |
| 7,006,021 B1 | 2/2006 | Lombaard | |
| 7,042,269 B2 | 5/2006 | Kao | |
| 7,233,350 B2 | 6/2007 | Tay | |
| 7,307,558 B1 | 12/2007 | Karim et al. | |
| 7,336,115 B2 | 2/2008 | Ehrenreich et al. | |
| 7,434,130 B2 | 10/2008 | Huisman et al. | |
| 7,876,362 B2 | 1/2011 | Krymski | |
| 7,973,612 B2 | 7/2011 | Raghunathan et al. | |
| 7,994,828 B2 | 8/2011 | Kao et al. | |

(Continued)

OTHER PUBLICATIONS

Luxima Technology, "LUXI3HS Datasheet Rev 2.5.", Feb. 2014 (as revised Sep. 5, 2016).

(Continued)

*Primary Examiner* — Nicholas G Giles
(74) *Attorney, Agent, or Firm* — Foley & Lardner LLP

(57) ABSTRACT

An image sensor includes a pixel array, a plurality of memory blocks, a plurality of phase-locked loops, and a plurality of serializers. The pixel array includes a plurality of pixels. The plurality of memory blocks store digital pixel data converted from analog pixel signals output from the pixel array, and are located to a particular side of the pixel array. The plurality of phase-locked loops are located to the particular side of the pixel array. The plurality of serializers are located to the particular side of the pixel array. Each serializer of the plurality of serializers is connected to receive parallel data input from one or more corresponding memory blocks of the plurality of memory blocks and is configured to convert the parallel data input to serial data output using a corresponding plurality of clock signals from a corresponding phase-locked loop of the plurality of phase-locked loops.

23 Claims, 11 Drawing Sheets

(56) References Cited

U.S. PATENT DOCUMENTS

| | | | |
|---|---|---|---|
| 8,064,267 B2 | 11/2011 | Sarin et al. | |
| 8,068,150 B2 | 11/2011 | Koganezawa et al. | |
| 8,174,603 B2 | 5/2012 | Krymski | |
| 8,207,794 B2 | 6/2012 | Lee et al. | |
| 8,484,604 B2 | 7/2013 | Jiang et al. | |
| 8,570,198 B2 | 10/2013 | Chang | |
| 8,810,290 B1 | 8/2014 | Cloutier et al. | |
| 9,484,912 B2 | 11/2016 | Lee | |
| 9,712,772 B2 | 7/2017 | Kim et al. | |
| 2003/0147005 A1* | 8/2003 | Okamoto | H04L 1/0065 348/473 |
| 2005/0034172 A1* | 2/2005 | Nohara | H04N 7/22 725/147 |
| 2005/0046744 A1* | 3/2005 | Ohkubo | H04N 7/22 348/489 |
| 2006/0215188 A1* | 9/2006 | Yazdy | H04N 1/4056 358/1.7 |
| 2007/0076109 A1 | 4/2007 | Krymski | |
| 2007/0245073 A1 | 10/2007 | Matsutani | |
| 2008/0258042 A1 | 10/2008 | Krymski | |
| 2009/0259781 A1 | 10/2009 | Padaparambil | |
| 2009/0273694 A1 | 11/2009 | Krymski | |
| 2009/0273696 A1 | 11/2009 | Krymski | |
| 2010/0054072 A1 | 3/2010 | Stansfield | |
| 2010/0097507 A1 | 4/2010 | Krymski | |
| 2010/0231282 A1 | 9/2010 | Singasani | |
| 2010/0309319 A1* | 12/2010 | Yanada | H04N 5/335 348/207.1 |
| 2012/0175498 A1 | 7/2012 | Krymski | |
| 2013/0027594 A1 | 1/2013 | Krymski | |
| 2013/0083179 A1* | 4/2013 | Kotani | H04N 5/217 348/65 |
| 2013/0176409 A1* | 7/2013 | Kotani | H04N 5/217 348/65 |
| 2015/0220383 A1* | 8/2015 | Saito | H04N 19/89 714/747 |
| 2016/0112661 A1* | 4/2016 | Yamamoto | H04N 5/3698 348/294 |

OTHER PUBLICATIONS

Wikipedia, "Clock signal", dated Nov. 13, 2016, https://web.archive.org/web/20161113194704/https://en.wikipedia.org/wiki/Clock_signal (4 pages).

Wikipedia, "Phase-locked loop", dated Dec. 31, 2016, https://web.archive.org/web/20161231155524/https://en.wikipedia.org/wiki/Phase-locked_loop (15 pages).

* cited by examiner

IMAGE SENSORS AND METHODS WITH MULTIPLE PHASE-LOCKED LOOPS AND SERIALIZERS

FIELD

Embodiments of the present invention relate generally to image sensors and methods and, in specific embodiments, to image sensors including a phase-locked loop and serializer.

BACKGROUND

Image sensors have found wide application in consumer and industrial electronics, and have enabled an explosion in a number of digital cameras and digital video devices used for work and entertainment. In many applications, and especially in industrial applications, there is a constant demand for image sensors with faster processing speed and better image quality. It is therefore advantageous to develop new circuits and techniques that allow for improved performance of image sensors.

Examples of related art image sensors are disclosed in the following documents: (1) U.S. Pat. No. 9,019,411 by Alexander Krymski, titled "Image Sensors and Methods with Pipelined Readout," issued Apr. 28, 2015, the entire contents of which are incorporated by reference herein; and (2) U.S. Pat. No. 8,174,603 by Alexander Krymski, titled "Image Sensors and Methods with Antiblooming Channels and Two Side Driving of Control Signals," issued May 8, 2012, the entire contents of which are incorporated by reference herein.

SUMMARY OF THE DISCLOSURE

An image sensor in accordance with an embodiment includes a pixel array, a plurality of memory blocks, a plurality of phase-locked loops, and a plurality of serializers. The pixel array includes a plurality of pixels arranged in a plurality of rows and a plurality of columns. The plurality of memory blocks are configured to store digital pixel data converted from analog pixel signals output from the pixel array, and the plurality of memory blocks are located to a particular side of the pixel array. The plurality of phase-locked loops are located to the particular side of the pixel array. The plurality of serializers are located to the particular side of the pixel array, and each serializer of the plurality of serializers is connected to receive parallel data input from one or more corresponding memory blocks of the plurality of memory blocks and is configured to convert the parallel data input to serial data output using a corresponding plurality of clock signals from a corresponding phase-locked loop of the plurality of phase-locked loops.

In various embodiments, the image sensor further includes a clock tree connected to two or more of the plurality of phase-locked loops and configured so as to provide for an equalized delay for a reference clock signal from a clock input pad to each of the two or more of the plurality of phase-locked loops. In some embodiments, each phase-locked loop of the plurality of phase-locked loops is configured to generate a respective plurality of clock signals based on the reference clock signal. Also, in some embodiments, each phase-locked loop of the plurality of phase-locked loops is connected to provide the respective plurality of clock signals to a corresponding one or more of the serializers of the plurality of serializers as the corresponding plurality of clock signals for the corresponding one or more serializers. In some embodiments, each phase-locked loop of the plurality of phase-locked loops is connected to receive the reference clock signal as an input signal for the phase locked loop. Also, in some embodiments, each phase-locked loop of the plurality of phase-locked loops is configured to generate a respective plurality of clock signals at different frequencies based at least partially on the reference clock signal.

In various embodiments, each memory block of the plurality of memory blocks includes a memory controller for generating one or more signals to control an output of the memory block. In some embodiments, each phase-locked loop of the plurality of phase-locked loops is configured to generate a particular clock signal to provide to a corresponding memory controller of a corresponding memory block of the plurality of memory blocks. In some embodiments, each memory block of the plurality of memory blocks is connected to provide output to a different serializer of the plurality of serializers than the other memory blocks of the plurality of memory blocks. Also, in some embodiments, each memory block of the plurality of memory blocks is connected to provide output to a corresponding serializer that is located closest to the memory block from among the plurality of serializers. In some embodiments, each phase-locked loop of the plurality of phase-locked loops is connected to provide output to a different serializer of the plurality of serializers than the other phase-locked loops of the plurality of phase-locked loops.

In various embodiments, the image sensor further includes a plurality of output data drivers that are each connected to receive corresponding serial data output from a corresponding serializer of the plurality of serializers and configured to transmit the corresponding serial data output using differential signaling. In some embodiments, the plurality of output data drivers are each configured to transmit serial data using a low-voltage differential signaling (LVDS) protocol. In some embodiments, the plurality of output data drivers are each configured to transmit serial data using a scalable low-voltage signaling (SLVS) protocol. In some embodiments, each serializer of the plurality of serializers includes a plurality of multiplexers arranged in a plurality of stages to convert the parallel data input from the one or more corresponding memory blocks to the serial data output. Also, in some embodiments, each of the plurality of stages of the plurality of multiplexers of each serializer of the plurality of serializers is connected to receive a respective clock signal from among the corresponding plurality of clock signals from the corresponding phase-locked loop.

In various embodiments, each memory block of the plurality of memory blocks includes a plurality of memory cells, a plurality of bit lines, a plurality of sense amplifiers, and a memory scan circuit. In some embodiments, each bit line of the plurality of bit lines is connected to one or more memory cells of the plurality of memory cells. In some embodiments, each sense amplifier of the plurality of sense amplifiers is connected to one or more bit lines of the plurality of bit lines. Also, in some embodiments, the memory scan circuit is configured to cause data to be read out from memory cells of the plurality of memory cells over the plurality of bit lines to be output by the plurality of sense amplifiers. In some embodiments, each serializer of the plurality of serializers is connected to corresponding sense amplifiers of the plurality of sense amplifiers of each of the one or more corresponding memory blocks of the plurality of memory blocks.

In various embodiments the image sensor further includes a plurality of memory controllers. In some embodiments, each memory controller of the plurality of memory controllers is configured to provide one or more control signals to a corresponding one or more memory blocks of the plurality of memory blocks. In some embodiments, the image sensor further includes a clock tree connected to each of the plurality of memory controllers and configured so as to provide for an equalized delay for an initialization signal from an input pad to each of the plurality of memory controllers.

In various embodiments, the image sensor further includes a second plurality of memory blocks, a second plurality of phase-locked loops, and a second plurality of serializers. In some embodiments, the second plurality of memory blocks are configured to store digital pixel data converted from analog pixel signals output from the pixel array. In some embodiments, the second plurality of memory blocks are located to a second side of the pixel array that is an opposite side of the pixel array from the particular side of the pixel array. In some embodiments, the second plurality of phase-locked loops are located to the second side of the pixel array. In some embodiments, the second plurality of serializers are located to the second side of the pixel array. Also, in some embodiments, each serializer of the second plurality of serializers is connected to receive parallel data input from one or more corresponding memory blocks of the second plurality of memory blocks and is configured to convert the parallel data input to serial data output using a corresponding plurality of clock signals from a corresponding phase-locked loop of the second plurality of phase-locked loops. In some embodiments, the image sensor further includes a clock tree connected to two or more of the second plurality of phase-locked loops and configured so as to provide for an equalized delay for a reference clock signal from a clock input pad to each of the two or more of the second plurality of phase-locked loops.

A method in accordance with an embodiment includes storing, by a plurality of memory blocks located to a particular side of a pixel array, digital pixel data converted from analog pixel signals output from the pixel array. In various embodiments, the method further includes generating, by each of a plurality of phase-locked loops located to the particular side of the pixel array, a plurality of clock signals. Also, in various embodiments, the method further includes converting, by each of a plurality of serializers located to the particular side of the pixel array, parallel data input received from one or more corresponding memory blocks of the plurality of memory blocks to serial data output using the plurality of clock signals generated by a corresponding phase-locked loop of the plurality of phase-locked loops.

In some embodiments, each of the plurality of serializers is connected to receive clock signals from a different phase-locked loop of the plurality of phase-locked loops than the other serializers of the plurality of serializers. Also, in some embodiments, each phase-locked loop of the plurality of phase-locked loops receives a reference clock signal over a clock tree that provides for an equalized delay for the reference clock signal from a clock input pad to each of the plurality of phase-locked loops. In some embodiments, the generating includes generating, by each of the plurality of phase-locked loops located to the particular side of the pixel array, the plurality of clock signals based at least partially on the reference clock signal.

In various embodiments, the method further includes storing, by a second plurality of memory blocks located to a second side of the pixel array that is an opposite side of the pixel array from the particular side of the pixel array, digital pixel data converted from analog pixel signals output from the pixel array. In some embodiments, the method further includes generating, by each of a second plurality of phase-locked loops located to the second side of the pixel array, a plurality of clock signals. Also, in some embodiments, the method further includes converting, by each of a second plurality of serializers located to the second side of the pixel array, parallel data input received from one or more corresponding memory blocks of the second plurality of memory blocks to serial data output using the plurality of clock signals generated by a corresponding phase-locked loop of the second plurality of phase-locked loops. In various embodiments, each phase-locked loop of the plurality of phase-locked loops and each phase-locked loop of the second plurality of phase-locked loops receives a reference clock signal over a clock tree that provides for an equalized delay for the reference clock signal from a clock input pad to each of the plurality of phase-locked loops and to each of the second plurality of phase-locked loops.

DETAILED DESCRIPTION

Figure 1:
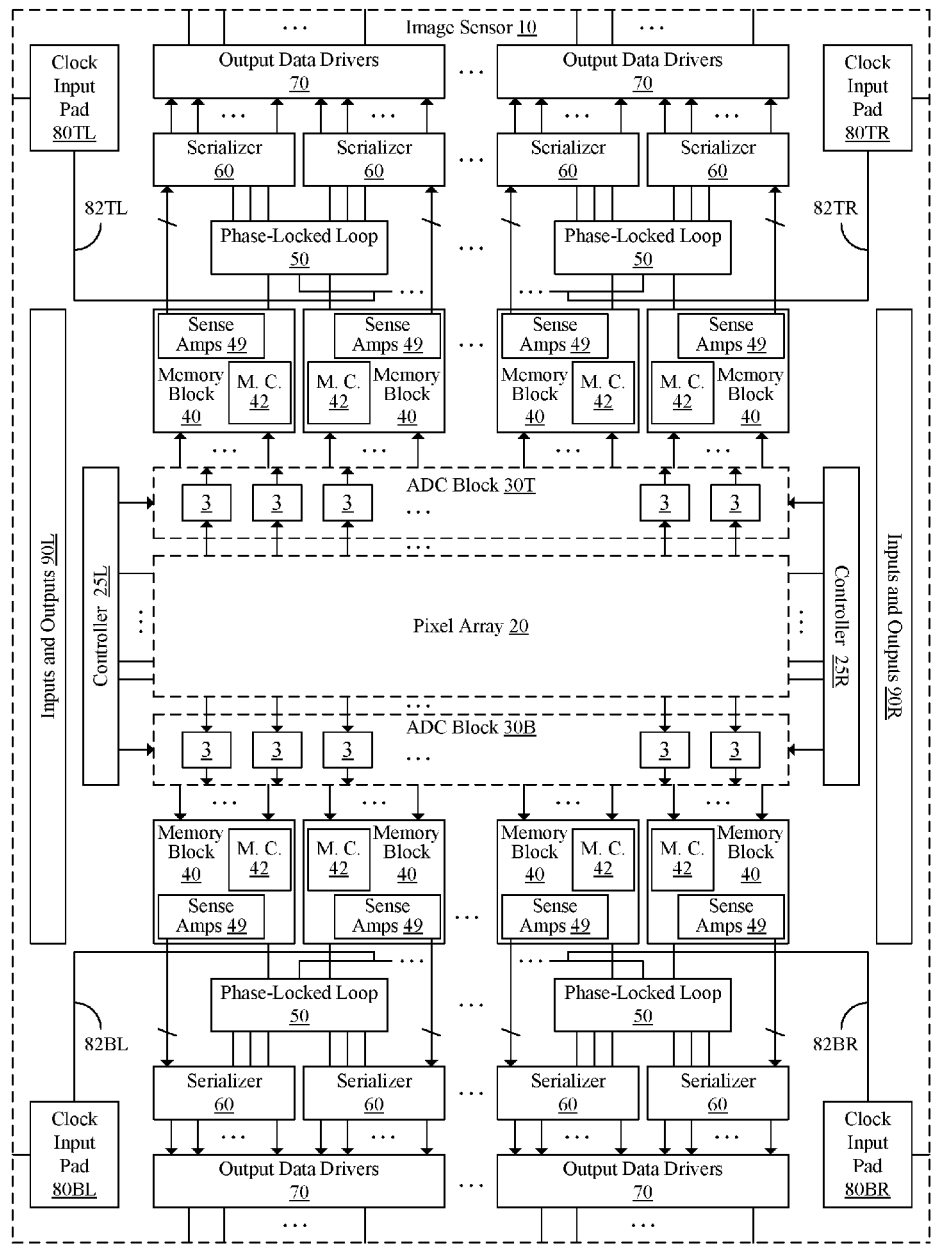
FIG. 1 shows an image sensor in accordance with an embodiment.

FIG. 1 shows a block diagram of an image sensor 10 in accordance with an embodiment. The image sensor 10 includes a pixel array 20, a controller 25L, a controller 25R, an analog-to-digital conversion (ADC) block 30T, an ADC block 30B, memory blocks 40, phase-locked loops 50, serializers 60, output data drivers 70, a clock input pad 80TL connected to a clock tree 82TL, a clock input pad 80TR connected to a clock tree 82TR, a clock input pad 80BL connected to a clock tree 82BL, a clock input pad 80BR connected to a clock tree 82BR, inputs and outputs 90L, and inputs and outputs 90R. In various embodiments, each memory block 40 includes a memory controller 42 and sense amplifiers 49.

Elements of the image sensor 10 can be referred to with respect to their position in relation to the pixel array 20. The controller 25L is located to a left side of the pixel array 20, and the controller 25R is located to a right side of the pixel array 20. The ADC block 30T is located to a top side of the pixel array 20, and the ADC block 30B is located to a bottom side of the pixel array 20. Some of the memory blocks 40 are located to the top side of the pixel array 20, and some of the memory blocks 40 are located to the bottom side of the pixel array 20. Some of the phase-locked loops 50 are located to the top side of the pixel array 20, and some of the phase-locked loops 50 are located to the bottom side of the pixel array 20. Some of the serializers 60 are located to the top side of the pixel array 20, and some of the serializers 60 are located to the bottom side of the pixel array 20. Some of the output data drivers 70 are located to the top side of the pixel array 20, and some of the output data drivers 70 are located to the bottom side of the pixel array 20.

The clock input pad 80TL is located to the top left of the image sensor 10 with respect to the pixel array 20, the clock input pad 80TR is located to the top right of the image sensor 10 with respect to the pixel array 20, the clock input pad 80BL is located to the bottom left of the image sensor 10 with respect to the pixel array 20, and the clock input pad 80BR is located to the bottom right of the image sensor 10 with respect to the pixel array 20. The inputs and outputs 90L are located to the left side of the pixel array 20, and the inputs and outputs 90R are located to the right side of the pixel array 20.

Figure 2:
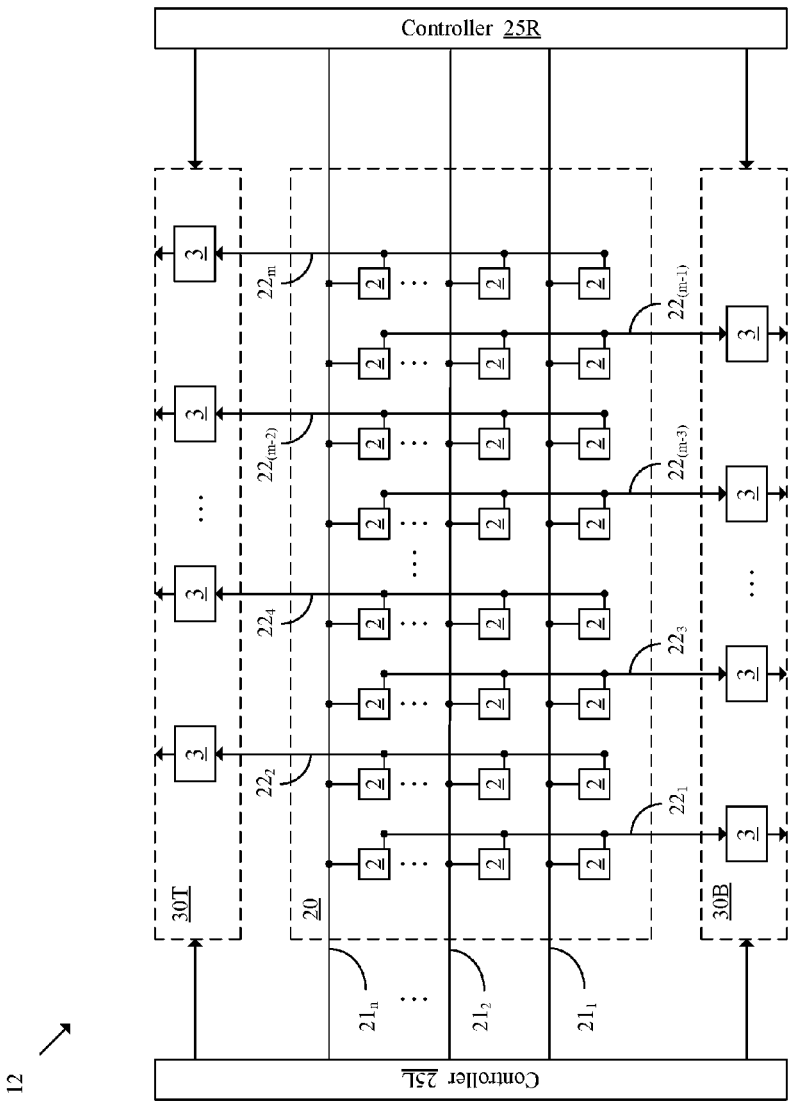
FIG. 2 shows a portion of the image sensor of FIG. 1 in accordance with an embodiment including a pixel array and analog-to-digital conversion blocks.

FIG. 2 shows a portion 12 of the image sensor 10 of FIG. 1 in accordance with an embodiment. In the embodiment of FIG. 2, the pixel array 20 includes a plurality of pixels 2 that are arranged in a plurality of rows and a plurality of columns. In various embodiments, each pixel 2 comprises a light sensitive element, such as a photodiode, or the like, to sample light intensity of a corresponding portion of a scene being imaged, and each pixel 2 is configured to produce an analog pixel signal based on the sampled light intensity. The controller 25L and the controller 25R are configured to supply control signals to the pixels 2 in the pixel array 20 to control an operation of the pixels 2. In various embodiments, the controller 25L and the controller 25R include row drivers for driving control signals to the pixels 2. Pixels 2 that are in a same row of the pixel array 20 may share common row control signals from the controllers 25L and 25R. For example, pixels 2 in a first row of the pixel array 20 share common row control signals over one or more control lines $21_1$, pixels 2 in a second row of the pixel array 20 share common row control signals over one or more control lines $21_2$, and pixels 2 in an $n^{th}$ row of the pixel array 20 share common row control signals over one or more control lines $21_n$.

In the embodiment of FIG. 2, pixels 2 that are in a same column of the pixel array 20 share a common column readout line to provide output of analog pixel signals. For example, pixels 2 in a first column of the pixel array 20 share a column readout line $22_1$, pixels 2 in a second column of the pixel array 20 share a column readout line $22_2$, pixels 2 in a third column of the pixel array 20 share a column readout line $22_3$, pixels 2 in a fourth column of the pixel array 20 share a column readout line $22_4$, pixels 2 in an $(m-3)^{rd}$ column of the pixel array 20 share a column readout line $22_{(m-3)}$, pixels 2 in an $(m-2)^{nd}$ column of the pixel array 20 share a column readout line $22_{(m-2)}$, pixels 2 in an $(m-1)^{st}$ column of the pixel array 20 share a column readout line $22_{(m-1)}$, and pixels 2 in an $m^{th}$ column of the pixel array 20 share a column readout line $22_m$. In various embodiments, the controllers 25L and 25R control the pixels 2 to provide output row by row.

In the embodiment in FIG. 2, the column readout lines $22_1$, $22_3$, . . . , $22_{(m-3)}$, $22_{(m-1)}$ for the odd columns of the pixel array 20 are connected to the ADC block 30B on the bottom side of the pixel array 20, while the column readout lines $22_2$, $22_4$, . . . , $22_{(m-2)}$, $22_m$ for the even columns of the pixel array 20 are connected to the ADC block 30T on the top side of the pixel array 20. The analog pixel signals output from the pixel array 20 are input to the corresponding ADC blocks 30B and 30T. In the embodiment in FIG. 2, each of the ADC blocks 30B and 30T has an analog-to-digital conversion (ADC) circuit 3 for each column readout line that is connected to that ADC block. Each ADC circuit 3 is configured to convert analog pixel signals received from the pixel array 20 into corresponding digital pixel data. The controllers 25L and 25R control an operation of the ADC circuits 3. Each of the ADC blocks 30B and 30T output digital pixel data from the ADC circuits 3 within that ADC block.

Figure 3:
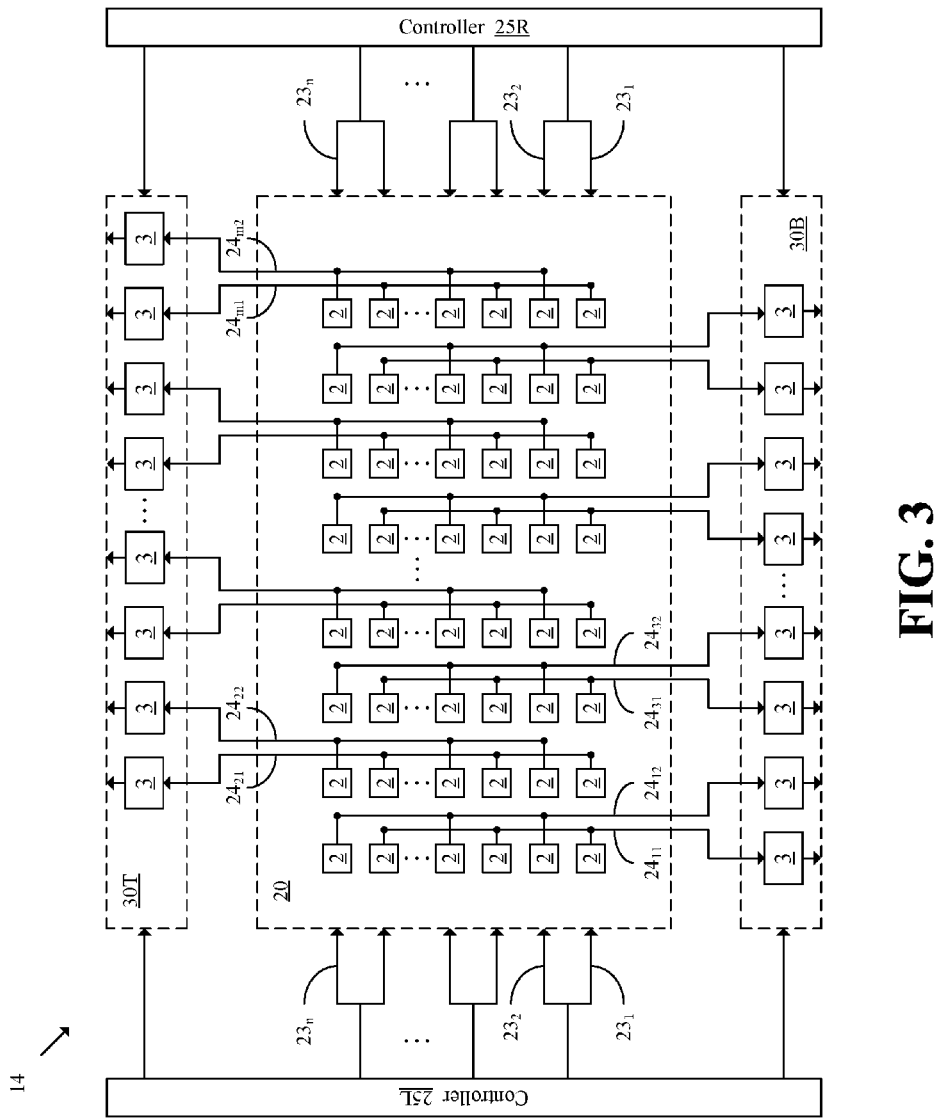
FIG. 3 shows a portion of the image sensor of FIG. 1 in accordance with another embodiment including a pixel array and analog-to-digital conversion blocks.

FIG. 3 shows a portion 14 of the image sensor 10 of FIG. 1 in accordance with another embodiment. In the embodiment of FIG. 3, the pixel array 20 includes a plurality of pixels 2 that are arranged in a plurality of rows and a plurality of columns. In various embodiments, each pixel 2 comprises a light sensitive element, such as a photodiode, or the like, to sample light intensity of a corresponding portion of a scene being imaged, and each pixel 2 is configured to produce an analog pixel signal based on the sampled light intensity. The controller 25L and the controller 25R are configured to supply control signals to the pixels 2 in the pixel array 20 to control an operation of the pixels 2. In various embodiments, the controller 25L and the controller 25R include row drivers for driving control signals to the pixels 2. Pixels 2 that are in a same row of the pixel array 20 may share common row control signals from the controllers 25L and 25R. For example, pixels 2 in a first row of the pixel array 20 share common row control signals over one or more control lines $23_1$, pixels 2 in a second row of the pixel array 20 share common row control signals over one or more control lines $23_2$, and pixels 2 in an $n^{th}$ row of the pixel array 20 share common row control signals over one or more control lines $23_n$.

In the embodiment of FIG. 3, there are two column readout lines per each column of pixels 2 in the pixel array 20. In various other embodiments, there may be more than two column readout lines per each column of pixels 2 in the pixel array 20. In various embodiments, each column in the pixel array 20 includes a corresponding first set of pixels 2 connected to output analog pixel signals to a respective first column readout line for the column, and a corresponding second set of pixels 2 connected to output analog pixel signals to a respective second column readout line for the column. For example, in the embodiment illustrated in FIG. 3, pixels 2 in odd rows in the first column of the pixel array 20 are connected to the column readout line $24_{11}$ to output analog pixel signals to the column readout line $24_{11}$, and pixels 2 in even rows in the first column of the pixel array 20 are connected to the column readout line $24_{12}$ to output analog pixel signals to the column readout line $24_{12}$.

Also, for example, in the embodiment illustrated in FIG. 3, pixels 2 in odd rows in the second column of the pixel array 20 are connected to the column readout line $24_{21}$ to output analog pixel signals to the column readout line $24_{21}$, and pixels 2 in even rows in the second column of the pixel array 20 are connected to the column readout line $24_{22}$ to output analog pixel signals to the column readout line $24_{22}$. Similarly, pixels 2 in odd rows in the third column of the pixel array 20 are connected to the column readout line $24_{31}$ to output analog pixel signals to the column readout line $24_{31}$, and pixels 2 in even rows in the third column of the pixel array 20 are connected to the column readout line $24_{32}$ to output analog pixel signals to the column readout line $24_{32}$. Also, in FIG. 3, pixels 2 in odd rows in the $m^{th}$ column of the pixel array 20 are connected to the column readout line $24_{m1}$ to output analog pixel signals to the column readout line $24_{m1}$, and pixels 2 in even rows in the $m^{th}$ column of the pixel array 20 are connected to the column readout line $24_{m2}$ to output analog pixel signals to the column readout line $24_{m2}$.

In various embodiments, the controllers 25L and 25R control the pixels 2 to provide output two rows at a time. In the embodiment in FIG. 3, the column readout lines for the odd columns of the pixel array 20 are connected to the ADC block 30B on the bottom side of the pixel array 20, while the column readout lines for the even columns of the pixel array 20 are connected to the ADC block 30T on the top side of the pixel array 20. The analog pixel signals output from the pixel array 20 are input to the corresponding ADC blocks 30B and 30T. In the embodiment in FIG. 3, each of the ADC blocks 30B and 30T has an ADC circuit 3 for each column readout line that is connected to that ADC block. Each ADC circuit 3 is configured to convert analog pixel signals received from the pixel array 20 into corresponding digital pixel data. The controllers 25L and 25R control an operation of the ADC circuits 3. Each of the ADC blocks 30B and 30T output digital pixel data from the ADC circuits 3 within that ADC block.

Figure 4:
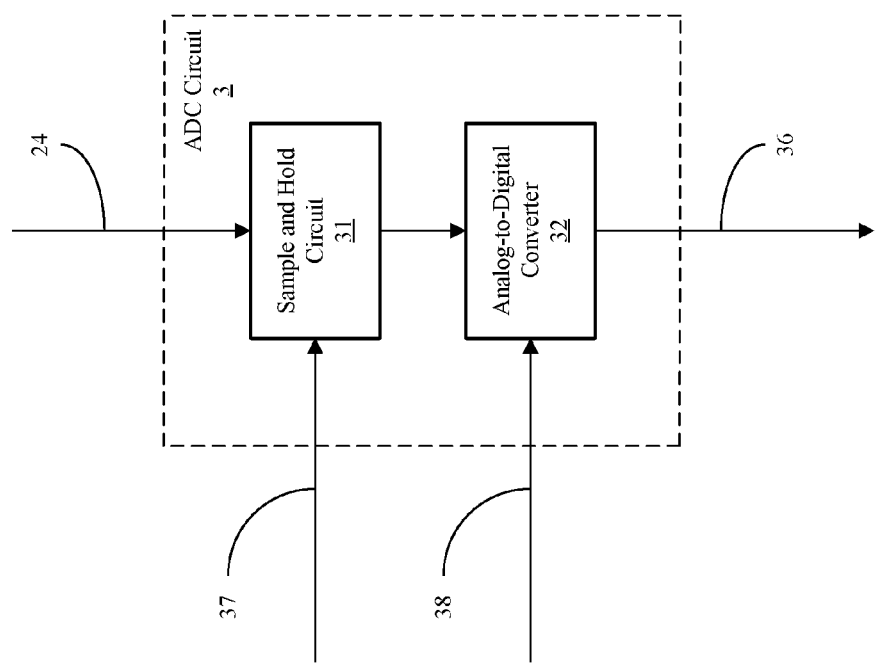
FIG. 4 shows an analog-to-digital conversion circuit in accordance with an embodiment.

FIG. 4 illustrates a block diagram of an embodiment of the ADC circuit 3. In various embodiments, the ADC circuit 3 includes a sample-and-hold circuit 31 and an analog-to-digital converter 32. In various embodiments, the ADC circuit 3 may comprise more than one sample-and-hold circuit 31 and more than one analog-to-digital converter 32. Also, in some embodiments, the ADC circuit 3 may further comprise one or more amplifiers (not shown). The sample-and-hold circuit 31 receives analog pixel signals from corresponding pixels 2 in the pixel array 20 (refer to FIG. 3) over a corresponding column readout line 24. If the analog pixel signals include, for example, both a photosignal component and a reference "reset" level component, then the sample-and-hold circuit 31 may be configured to store the photosignal component and the reference reset level component. The sample-and-hold circuit 31 may be controlled by one or more controllers, such as the controllers 25L and 25R (refer to FIG. 3), or the like, that supply control signals over control line 37. In some embodiments, a difference between the photosignal component and the reference reset level stored in the sample-and-hold circuit 31 is amplified and provided to the analog-to-digital converter 32.

In various embodiments, the analog-to-digital converter 32 is, for example, an analog-to-digital converter of a successive-approximation type, or the like. The analog-to-digital converter 32 receives analog signals provided from the sample-and-hold circuit 31, and the analog-to-digital converter 32 is configured to convert the received analog signals into corresponding digital pixel data to be provided on one or more output lines 36. Operations of the analog-to-digital converter 32 may be controlled by one or more controllers, such as the controllers 25L and 25R (refer to FIG. 3), or the like, that supply control signals over a control line 38. In various embodiments, the digital pixel data provided by the analog-to-digital converter 32 may specify digital pixel values as one or more bits, such as, for example, ten bits for each digital pixel value that are provided as output over the one or more output lines 36.

In various other embodiments, other arrangements may be used for the pixel array 20, as well as the ADC block 30T and the ADC block 30B. For example, in some embodiments, the pixel array 20 may have multiple column readout lines per column of pixels where each column readout line is connected to both an ADC block on the top side of the pixel array and an ADC block on the bottom side of the pixel array. In some embodiments, such as the embodiment in FIG. 2, there is one ADC circuit 3 for each column of pixels. Is some embodiments, such as the embodiment in FIG. 3, there is more than one ADC circuit 3 for each column of pixels. In some other embodiments, each ADC circuit can be shared among two or more columns of pixels.

Referring again to FIG. 1, the ADC block 30T is connected to output digital pixel data to several memory blocks 40 that are located to a top side of the pixel array 20. Similarly, the ADC block 30B is connected to output digital pixel data to several memory blocks 40 that are located to a bottom side of the pixel array 20. In some embodiments, the pixel array 20 includes, for example, 1,024 rows and 1,296 columns of pixels and there are two ADC circuits 3 in the ADC block 30T for each even column of pixels, and two ADC circuits 3 in the ADC block 30B for each odd column of pixels such that there are 1,296 ADC circuits 3 in the ADC block 30T and 1,296 ADC circuits 3 in the ADC block 30B. Also, in some embodiments, each memory block 40 is connected to receive digital pixel data from multiple ADC circuits 3. For example, in some embodiments, there are 1,296 ADC circuits 3 in the ADC block 30T and 1,296 ADC circuits 3 in the ADC block 30B, and each memory block 40 is connected to receive digital pixel data from 108 ADC circuits 3, such that there are 12 memory blocks 40 connected to the ADC block 30T and 12 memory blocks connected to the ADC block 30B. Of course, those numbers are merely provided as examples, and any desired number of pixels, ADC circuits, and memory blocks may be employed.

Figure 5:
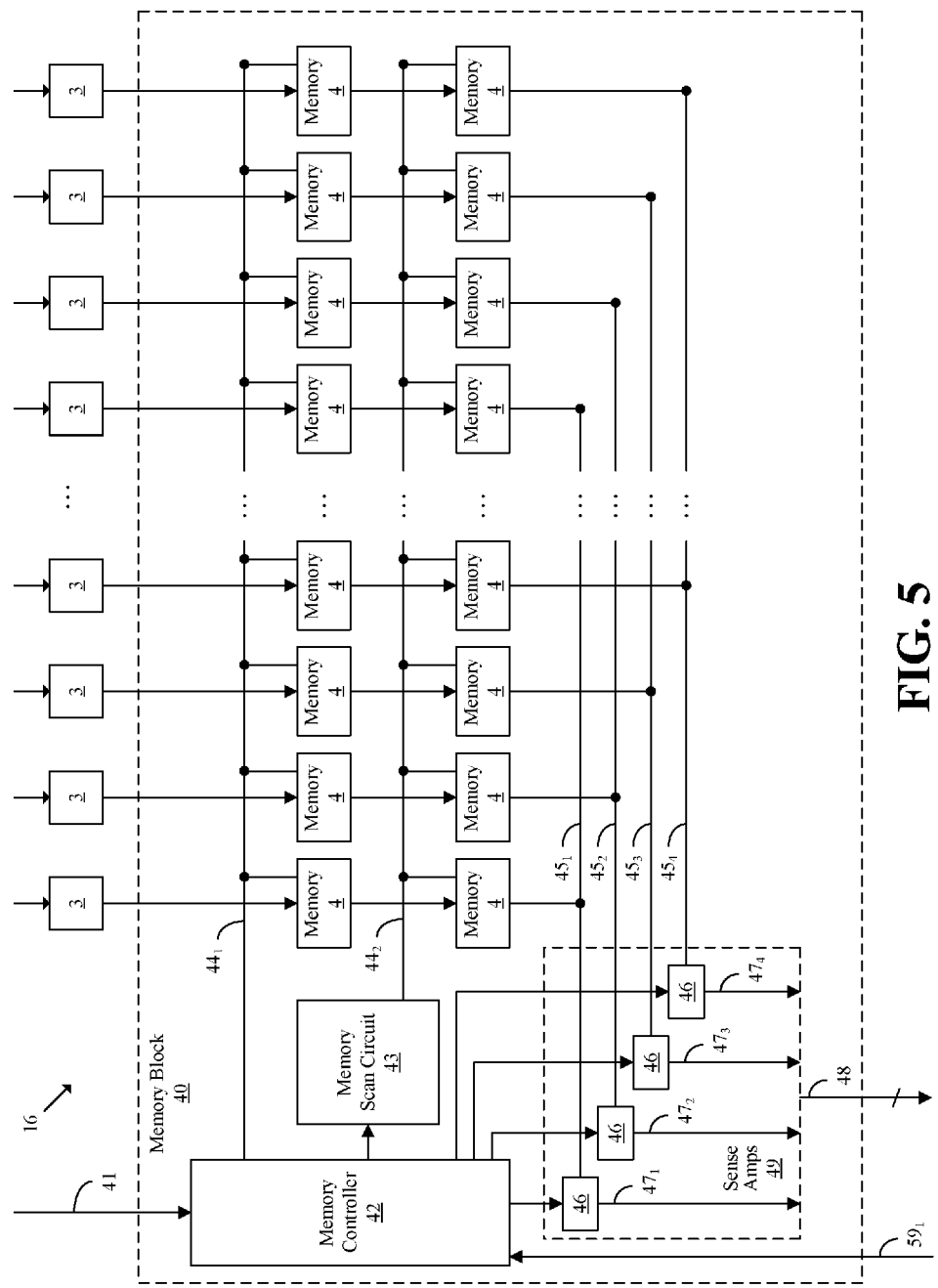
FIG. 5 shows a portion of the image sensor of FIG. 1 in accordance with an embodiment including a plurality of analog-to-digital conversion circuits connected to a memory block.

FIG. 5 shows a portion 16 of the image sensor 10 of FIG. 1 in accordance with an embodiment including one of the memory blocks 40 connected to receive digital pixel data from several of the ADC circuits 3. For example, as stated above, each memory block 40 may be connected to receive digital pixel data from 108 of the ADC circuits 3. The memory block 40 includes a plurality of memories 4 in a first row of memories that are each connected to receive digital pixel data from a corresponding ADC circuit 3, and a plurality of memories 4 in a second row of memories that are each connected to receive digital pixel data from a corresponding memory 4 in the first row of memories. The memory block 40 further includes the memory controller 42, a memory scan circuit 43, a first readout bus $45_1$ connected to one or more sense amplifiers 46, a second readout bus $45_2$ connected to one or more sense amplifiers 46, a third readout bus $45_3$ connected to one or more sense amplifiers 46, and a fourth readout bus $45_4$ connected to one or more sense amplifiers 46. All of the one or more sense amplifiers 46 are shown as the sense amplifiers 49 of the memory block 40.

The memory controller 42 is connected to receive an initialization signal over a signal tree 41, and is connected to receive a clock signal from a corresponding phase-locked loop 50 (refer to FIG. 1) over a corresponding clock signal line $59_1$. The memory controller 42 is configured to control the memory scan circuit 43 and each of the one or more sense amplifiers 46 based at least partially on the initialization signal received over the signal tree 41 and the clock signal received over the clock signal line $59_1$. In various embodiments, the initialization signal indicates when memory read and write operations by the memories 4 should begin for an image capture operation.

The memory controller 42 is also configured to control the memories 4 in the first row of memories by sending control signals over one or more control lines $44_1$. The memory scan circuit 43 is configured to control the memories 4 in the second row of memories by sending control signals over one or more control lines $44_2$. The memory controller 42 provides control signals on the one or more control lines $44_1$ to control which of the memories 4 in the first row of memories read or write at a given time. The memory scan circuit 43 provides control signals on the one or more control lines $44_2$ to control which of the memories 4 in the second row of memories read or write at a given time. The memory controller 42 generates a waveform to control the memory scan circuit 43 using the clock signal received over the clock signal line $59_1$.

Each memory 4 may comprise, for example, one or more memory cells. In various embodiments, each memory 4 comprises, for example, dynamic random access memory (DRAM) cells, static random access memory (SRAM) cells, or the like, for storing digital data. In various embodiments, the memory controller 42 controls one or more of the memories 4 in the first row of memories to read in data during a first time period while the memory scan circuit 43 controls one or more of the memories 4 in the second row of memories to output digital pixel data to the first readout bus $45_1$, second readout bus $45_2$, third readout bus $45_3$, and a fourth readout bus $45_4$. In various embodiments, the memory controller 42 further controls the memories 4 in the first row of memories to output data during a second time period while the memory scan circuit 43 controls the memories 4 in the second row of memories to read in data from corresponding memories 4 in the first row of memories. In various embodiments, the memory block 40 has a number of memories 4 in the first row of memories that is equal to a number of ADC circuits 3 that supply digital pixel data to the memory block 40, and has a number of memories 4 in the second row of memories that is equal to the number of memories 4 in the first row of memories.

In various embodiments, each of the readout buses $45_1$, $45_2$, $45_3$, $45_4$ comprises one or more bit lines. For example, in some embodiments, each of the readout buses $45_1$, $45_2$, $45_3$, $45_4$ includes 10 bit lines such that a 10 bit digital pixel value is able to be transmitted in parallel over a readout bus. Although four readout buses are depicted, it should be understood that any desired number of readout buses could be used in other embodiments. In various embodiments, each of the readout buses $45_1$, $45_2$, $45_3$, $45_4$ is selectively connected to corresponding memories 4 in the second row of memories. For example, in various embodiments (i) the memories 4 in positions 1, 5, 9, . . . , of the second row of memories 4 are connected to output to the first readout bus $45_1$; (ii) the memories 4 in positions 2, 6, 10, . . . , of the second row of memories 4 are connected to output to the second readout bus $45_2$; (iii) the memories 4 in positions 3, 7, 11, . . . , of the second row of memories 4 are connected to output to the third readout bus $45_3$; and (iv) the memories 4 in positions 4, 8, 12, . . . , of the second row of memories 4 are connected to output to the fourth readout bus $45_4$.

The one or more sense amplifiers 46 connected to the first readout bus $45_1$ sense digital signals that are placed onto the first readout bus $45_1$ from memories 4 that are connected to the first readout bus $45_1$. In various embodiments, there is one sense amplifier of the one or more sense amplifiers 46 for each bit line of the first readout bus $45_1$. The one or more sense amplifiers 46 connected to the first readout bus $45_1$ are connected to output the digital pixel data on an output bus $47_1$. The one or more sense amplifiers 46 connected to the second readout bus $45_2$ sense digital signals that are placed onto the second readout bus $45_2$ from memories 4 that are connected to the second readout bus $45_2$. In various embodiments, there is one sense amplifier of the one or more sense amplifiers 46 for each bit line of the second readout bus $45_2$. The one or more sense amplifiers 46 connected to the second readout bus $45_2$ are connected to output the digital pixel data on an output bus $47_2$.

The one or more sense amplifiers 46 connected to the third readout bus $45_3$ sense digital signals that are placed onto the third readout bus $45_3$ from memories 4 that are connected to the third readout bus $45_3$. In various embodiments, there is one sense amplifier of the one or more sense amplifiers 46 for each bit line of the third readout bus $45_3$. The one or more sense amplifiers 46 connected to the third readout bus $45_3$ are connected to output the digital pixel data on an output bus $47_3$. The one or more sense amplifiers 46 connected to the fourth readout bus $45_4$ sense digital signals that are placed onto the fourth readout bus $45_4$ from memories 4 that are connected to the fourth readout bus $45_4$. In various embodiments, there is one sense amplifier of the one or more sense amplifiers 46 for each bit line of the fourth readout bus $45_4$. The one or more sense amplifiers 46 connected to the fourth readout bus $45_4$ are connected to output the digital pixel data on an output bus $47_4$. In various embodiments, the lines for the output buses $47_1$, $47_2$, $47_3$, and $47_4$ together are all part of an output bus 48 that provides output from the memory block 40.

In various embodiments, the memory scan circuit 43 controls the memories 4 in the second row of memories such that a group of four memories 4 are controlled to provide output to the readout buses $45_1$, $45_2$, $45_3$, $45_4$, respectively, at a same time, and then another group of four memories 4, and so on until all memories 4 in the second row of memories have been read out. In various embodiments, the memory controller 42 is configured to provide waveforms to each of the one or more sense amplifiers 46 based at least partially on the clock signal received over the corresponding clock signal line $59_1$ to control operations of the one or more sense amplifiers to amplify and output the sensed digital pixel data.

In the design of the memory block 40 of FIG. 5, the signals travel to the left over the readout buses $45_1$, $45_2$, $45_3$, $45_4$, and are then amplified and output from the bottom of the memory block 40 over the output bus 48. The design of the memory block 40 may be replicated and flipped horizontally to have signals travel to the right over the readout buses $45_1$, $45_2$, $45_3$, $45_4$. Also, those designs of the memory block 40 may be replicated and flipped vertically to output from the top of the memory block 40 over the output bus 48. With reference to FIG. 1, there are a plurality of the memory blocks 40 located to the top side of the pixel array 20 for receiving digital pixel data from one or more corresponding ADC circuits 3 of the ADC block 30T, and there are a plurality of the memory blocks 40 located to the bottom side of the pixel array 20 for receiving digital pixel data from one or more corresponding ADC circuits 3 of the ADC block 30B.

Figure 6:
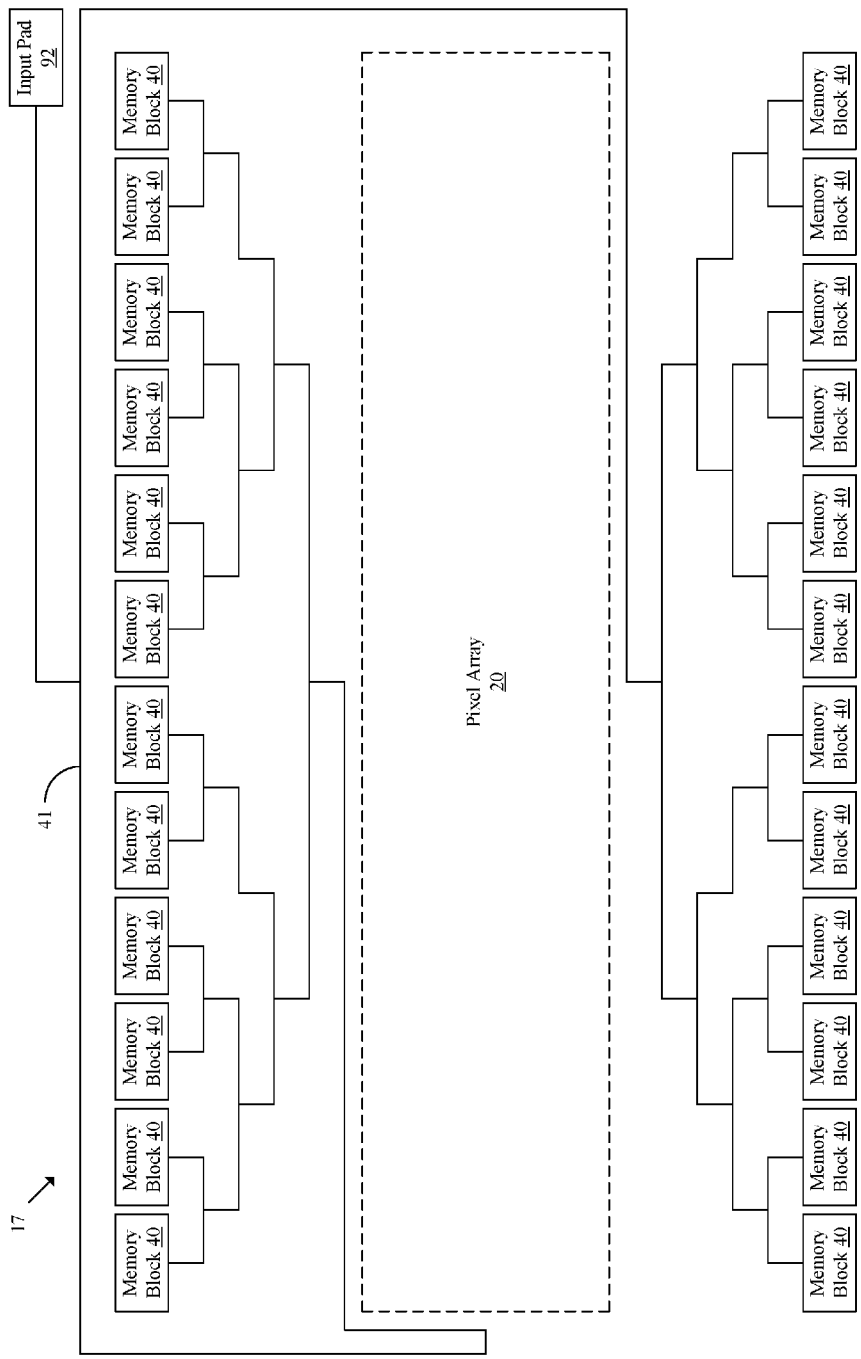
FIG. 6 shows a portion of the image sensor from FIG. 1 in accordance with an embodiment with some elements and connections removed so as to highlight a signal tree connected to memory blocks.

FIG. 6 shows a portion 17 of the image sensor 10 (refer to FIG. 1) in accordance with an embodiment with some elements removed to highlight the signal tree 41 connected to each of the memory blocks 40. With reference to FIGS. 5 and 6, the signal tree 41 is connected from an input pad 92 to each memory controller 42 of each of the plurality of memory blocks 40 and is configured so as to provide for an equalized delay for the initialization signal from the input pad 92 to each memory controller 42 of each of the memory blocks 40. In various embodiments, the signal tree 41 is constructed such that there is an equal length of signal line from the input pad 92 to each of the memory blocks 40. Thus, in various embodiments, the initialization signal for the memory controllers belonging to different memory blocks 40 is coming from one source, such as the input pad 92, through a delay-equalizing signal tree, such as the signal tree 41. In various embodiments, the signal tree 41 goes from the input pad 92 to a point that is in line with a center of the pixel array 20 and then branches out to the memory blocks 40 with equal length branches.

In various embodiments, the memory controller 42 may be outside of a memory block 40 and shared among two or more memory blocks 40. For example, one memory controller 42 may be shared among two memory blocks 40 such that there is one memory controller 42 for every two memory blocks 40. In some such embodiments, the signal tree 41 is configured so as to provide for an equalized delay for the initialization signal from the input pad 92 to each memory controller 42, and each memory controller 42 is configured to provide control signals to the memory blocks 40 to which it is connected.

Figure 7:
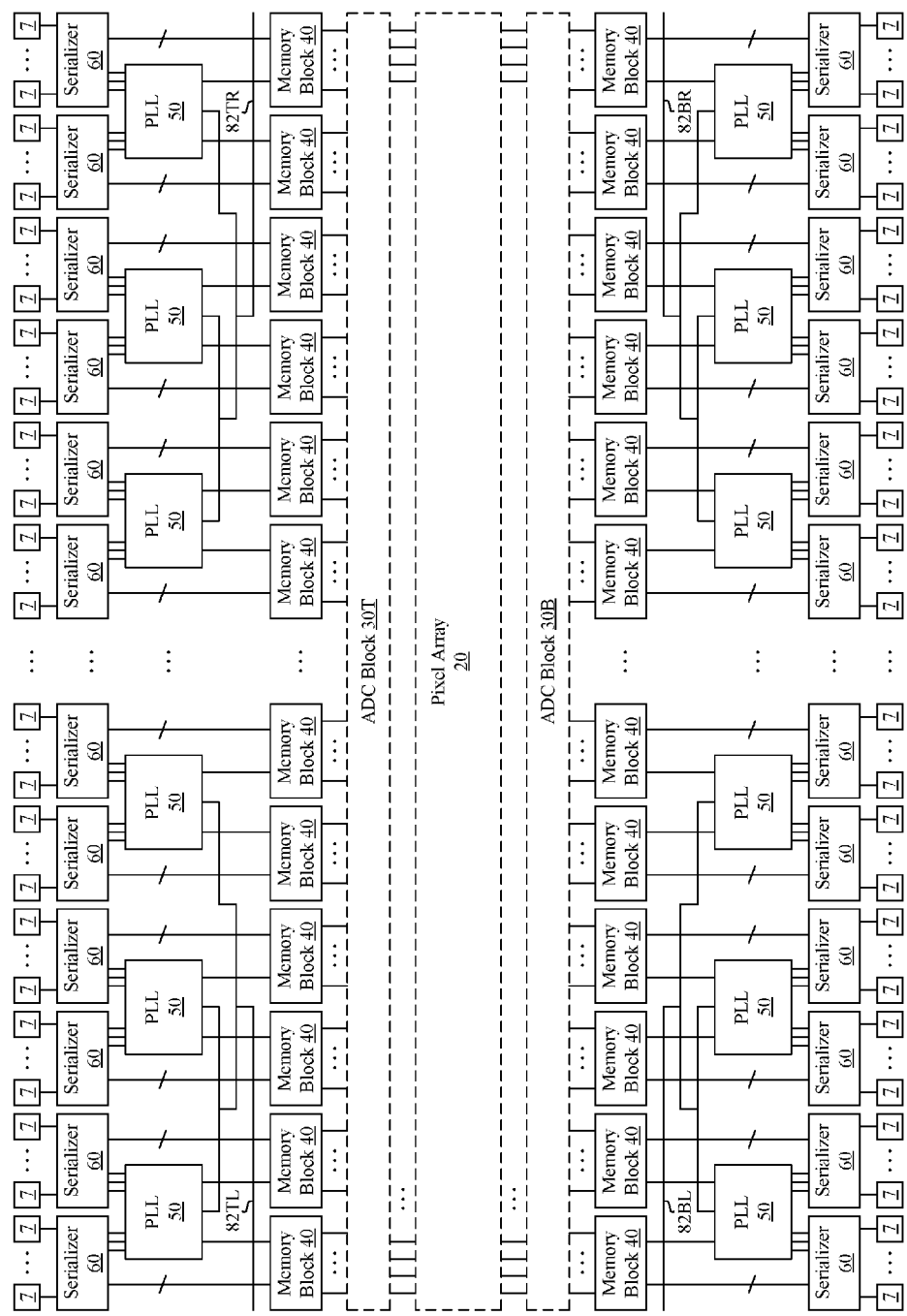
FIG. 7 shows a portion of the image sensor of FIG. 1 in accordance with an embodiment including multiple memory blocks, phase-locked loops, and serializers located to a top side of a pixel array, and multiple memory blocks, phase-locked loops, and serializers located to a bottom side of the pixel array.

FIG. 7 shows a portion of the image sensor 10 of FIG. 1. Referring to FIGS. 1 and 7, the analog pixel signals output from the pixel array 20 are provided to the ADC blocks 30T and 30B. There are a plurality of memory blocks 40 connected to receive digital pixel data from corresponding ADC circuits 3 of the ADC block 30T, and a plurality of memory blocks 40 connected to receive digital pixel data from corresponding ADC circuits 3 of the ADC block 30B. There are multiple phase-locked loops 50 located to a top side of the pixel array 20 and multiple phase-locked loops 50 located to a bottom side of the pixel array 20. Each phase-locked loop 50 is connected to a corresponding clock tree, such as a corresponding one of the clock trees 82TL, 82TR, 82BL, 82BR to receive a reference clock signal from a corresponding one of the clock input pads 80TL, 80TR, 80BL, 80BR. In various embodiments, each of the clock input pads 80TL, 80TR, 80BL, 80BR receive the same reference clock signal from outside of the image sensor 10.

Figure 8:
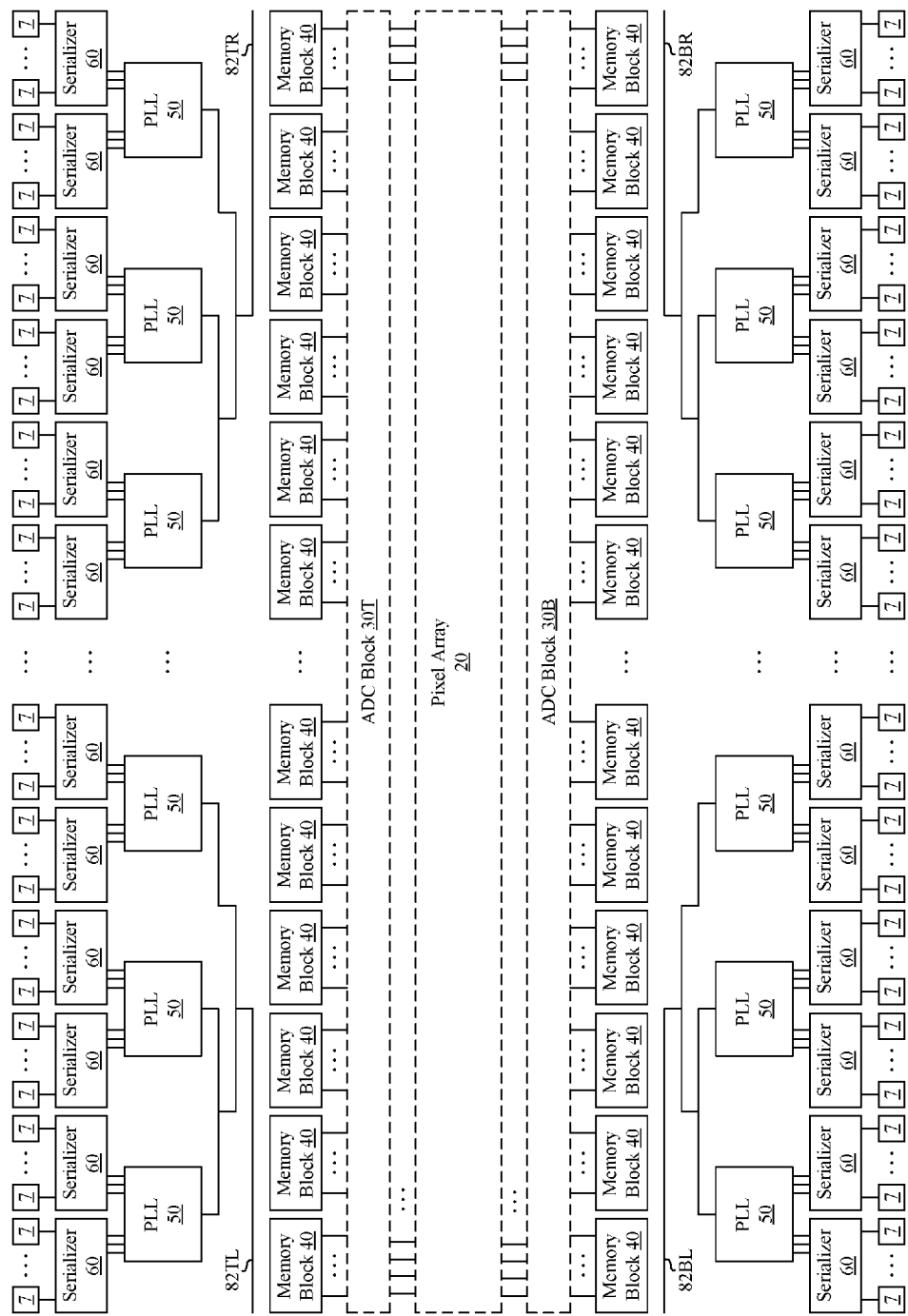
FIG. 8 shows the portion of the image sensor from FIG. 7 with some connections removed so as to highlight clock trees connected to phase-locked loops.

Each of the clock trees 82TL, 82TR, 82BL, 82BR is connected to a corresponding plurality of phase-locked loops 50. FIG. 8 shows the portion of the image sensor shown in FIG. 7 with some connections removed so as to highlight the clock trees 82TL, 82TR, 82BL, 82BR. With reference to FIGS. 1, 7, and 8, the clock tree 82TL is connected from the clock input pad 80TL to a plurality of phase-locked loops 50 located in the top left quadrant of the image sensor 10. The clock tree 82TL is configured so as to provide for an equalized delay for the reference clock signal from the clock input pad 80TL to each of the phase-locked loops 50 to which the clock tree 82TL is connected. The clock tree 82TR is connected from the clock input pad 80TR to a plurality of phase-locked loops 50 located in the top right quadrant of the image sensor 10. The clock tree 82TR is configured so as to provide for an equalized delay for the reference clock signal from the clock input pad 80TR to each of the phase-locked loops 50 to which the clock tree 82TR is connected.

The clock tree 82BL is connected from the clock input pad 80BL to a plurality of phase-locked loops 50 located in the bottom left quadrant of the image sensor 10. The clock tree 82BL is configured so as to provide for an equalized delay for the reference clock signal from the clock input pad 80BL to each of the phase-locked loops 50 to which the clock tree 82BL is connected. The clock tree 82BR is connected from the clock input pad 80BR to a plurality of phase-locked loops 50 located in the bottom right quadrant of the image sensor 10. The clock tree 82BR is configured so as to provide for an equalized delay for the reference clock signal from the clock input pad 80BR to each of the phase-locked loops 50 to which the clock tree 82BR is connected. While four separate clock trees 82TL, 82TR, 82BL, 82BR are illustrated, it should be understood that, in various other embodiments, different numbers of clock trees could be used such as, for example, one clock tree from a single input pad to all of the phase-locked loops 50, or two clock trees with one for the phase-locked loops 50 located to the top side of the pixel array 20 and one for the phase-locked loops 50 located to the bottom side of the pixel array 20.

In various embodiments, each phase-locked loop 50 is connected to provide a clock signal to a corresponding one or more of the memory blocks 40. For example, in some embodiments such as the embodiment shown in FIGS. 1 and 7, each phase-locked loop 50 is connected to provide a clock signal to two corresponding memory blocks 40. In some other embodiments, there may be a separate phase-locked loop 50 for each memory block 40. Also, in some other embodiments, each phase-locked loop 50 may be shared by more than two memory blocks 40.

There are multiple serializers 60 located to a top side of the pixel array 20 and multiple serializers 60 located to a bottom side of the pixel array 20. In various embodiments, each phase-locked loop 50 is connected to provide a plurality of clock signals to a corresponding one or more of the serializers 60. For example, in some embodiments such as the embodiment shown in FIGS. 1 and 7, each phase-locked loop 50 is connected to provide a plurality of clock signals to two corresponding serializers 60. In some other embodiments, there may be a separate phase-locked loop 50 for each serializer 60. Also, in some other embodiments, each phase-locked loop 50 may be shared by more than two serializers 60. Each serializer 60 provides output to one or more output data drivers 70 that are used to provide output from the image sensor 10. In various embodiments, each of the output data drivers 70 includes more than one output data driver 7.

Figure 9:
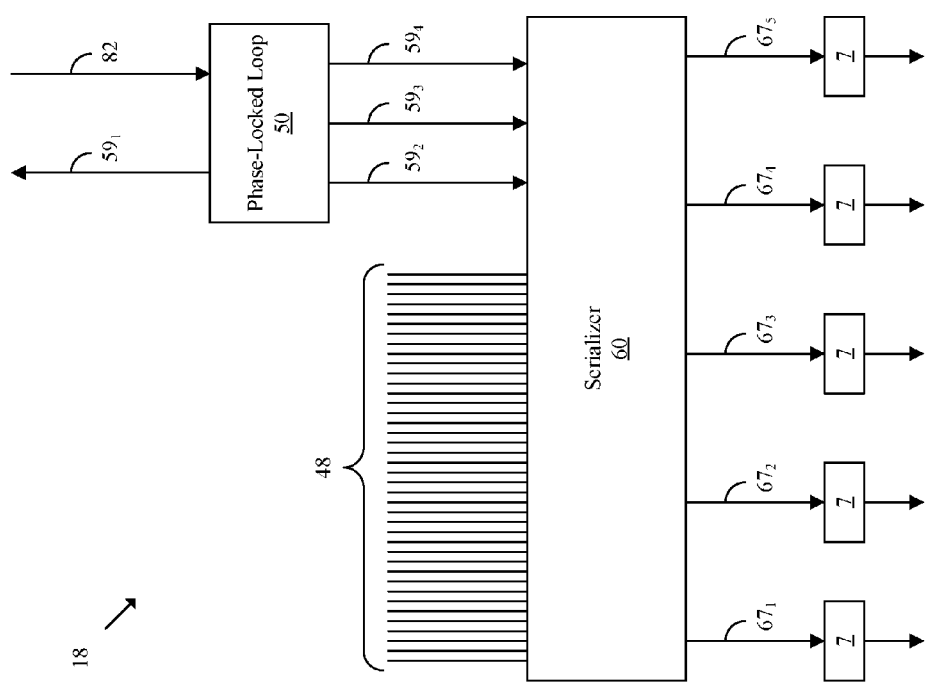
FIG. 9 shows a portion of the image sensor of FIG. 1 in accordance with an embodiment including a phase-locked loop and a serializer connected to output data drivers.

FIG. 9 shows a portion 18 of the image sensor 10 of FIG. 1 in accordance with an embodiment including one of the phase-locked loops 50 and one of the serializers 60 connected to output drivers 7. In various embodiments, the phase-locked loop (PLL) 50 is configured to generate multiple clock signals at different frequencies. In various embodiments, the phase-locked loop 50 receives as input the reference clock signal from a clock tree 82. Referring to FIGS. 1 and 9, the clock tree 82 connected to the phase-locked loop 50 would be, for example, the clock tree 82TL for phase-locked loops 50 located in the top left quadrant of the image sensor 10, the clock tree 82TR for phase-locked loops 50 located in the top right quadrant of the image sensor 10, the clock tree 82BL for phase-locked loops 50 located in the bottom left quadrant of the image sensor 10, and the clock tree 82BR for phase-locked loops 50 located in the bottom right quadrant of the image sensor 10.

In various embodiments, the phase-locked loop 50 is configured to generate multiple clock signals with different frequencies based on the reference clock signal received from a clock tree 82. As an example, in various embodiments the phase-locked loop 50 is configured to generate clock signals based on the reference clock signal such that a clock signal output on the clock signal line $59_4$ has a frequency of 800 MHz, a clock signal output on the clock signal line $59_3$ has a frequency of 400 MHz, a clock signal output on the clock signal line $59_2$ has a frequency of 200 MHz, and a clock signal output on the clock signal line $59_1$ has a frequency of 100 MHz. Therefore, the phase-locked loop 50 is configured to generate a plurality of clock signals at different frequencies. Of course, those frequency values are just provided as an example and, in various other embodiments, different frequency values may be used. The phase-locked loop 50 is shown in FIG. 9 as generating four clock signals, but it should be appreciated that in various other embodiments a phase-locked loop may be used to generate any desired number of clock signals. Also, the phase-locked loop 50 may be used to generate the clock signals with other frequencies, such as, for example, 200 MHz, 400 MHz, 800 MHz, and 1.6 GHz.

Any design of a phase-locked loop capable of generating the clock signals at the different frequencies can be used for the phase-locked loop 50. For example, in various embodiments, the phase-locked loop 50 includes a voltage controlled oscillator (VCO) or the like that is controlled based on the output of a comparison of a phase difference between the reference clock signal from the clock tree 82 and a feedback signal of the phase-locked loop 50 to generate the clock signal over the clock signal line $59_4$ with a frequency that is a multiple of the frequency of the reference clock signal from the clock tree 82. In some such embodiments, the clock signal that is provided over the clock signal line $59_4$ may also be divided within the phase-locked loop 50 by successive frequency dividers of the phase-locked loop 50 to generate the clock signals on the clock signal lines $59_3$, $59_2$, and $59_1$.

Referring to FIGS. 1, 7, and 9, in various embodiments each serializer 60 is connected to receive parallel data input from one or more corresponding memory blocks 40 and is configured to convert the parallel data input to serial data output using a corresponding plurality of clock signals from a corresponding phase-locked loop 50. In various embodiments, the clock signal lines $59_2$, $59_3$, and $59_4$ of each phase-locked loop 50 are connected to one or more serializers 60 to supply a plurality of clock signals of different frequencies to the one or more serializers 60. As an example, each phase-locked loop 50 may be connected to supply clock signals to two serializers 60 over the corresponding clock signal lines for the phase-locked loop 50. Also, in various embodiments, the clock signal line $59_1$ of each phase-locked loop 50 is connected to one or more memory blocks 40 to supply a clock signal to the one or more memory blocks 40. As an example, each phase-locked loop 50 may be connected to supply a clock signal to two memory blocks 40 over the corresponding clock signal line $59_1$ for the phase-locked loop 50. In some embodiments, for example, the clock signal over the clock signal line $59_1$ to the corresponding memory blocks 40 has a frequency of 100 MHz, and the clock signals over the clock signal lines $59_2$, $59_3$, and $59_4$ to the corresponding serializers 60 have frequencies of 200 MHz, 400 MHz, and 800 MHz, respectively. Of course, those frequency values are just provided as an example and, in various other embodiments, different frequency values may be used.

In various embodiments, each memory block 40 is connected to provide output to a different serializer 60 than the other memory blocks 40. Also, in various embodiments, each memory block 40 is connected to provide output to a corresponding serializer 60 that is located closest to the memory block 40 from among all of the serializers 60. In various embodiments, each phase-locked loop 50 is connected to provide output to a different serializer 60 than the other phase-locked loops 50.

Each serializer 60 is configured to convert parallel data input to serial data output using a plurality of clock signals from the corresponding phase-locked loop 50. With reference to FIGS. 1, 5, 7, and 9, in various embodiments the serializer 60 receives clock signals from the corresponding phase-locked loop 50 over the clock signal lines $59_2$, $59_3$, and $59_4$. The serializer 60 also receives digital pixel data as parallel data input over the output bus 48 from a corresponding memory block 40. In various embodiments, the output bus 48 includes a plurality of bit lines, such as, for example, forty bit lines as shown in FIG. 9. Of course, other embodiments may have different numbers of bit lines for the output bus 48. The serializer 60 is configured to convert the parallel data input from the output bus 48 to one or more streams of serial data output, such as serial data streams on output lines $67_1$, $67_2$, $67_3$, $67_4$, and $67_5$, using the plurality of clock signals from the corresponding phase-locked loop 50.

Any design of a serializer capable of converting parallel data input to serial data output can be used for the serializer 60. In an example embodiment, the serializer 60 includes five multiplexer stages units that each receive eight bits in parallel from a corresponding eight bit lines of the output bus 48 and output the eight bits serially on a corresponding one of the output lines $67_1$, $67_2$, $67_3$, $67_4$, and $67_5$. In some such embodiments, each multiplexer stages unit of the serializer 60 includes multiplexers arranged in stages, such as four multiplexers in a first stage, two multiplexers in a second stage, and one multiplexer in a third stage where each stage of multiplexers of the multiplexer stages unit receives a clock signal of a different frequency over a corresponding one of the clock signal lines $59_2$, $59_3$, and $59_4$ from the corresponding phase-locked loop 50 to convert the data from parallel to serial data. Also, in some such embodiments, the serializer 60 provides serial data output on the output line $67_1$ to a corresponding output data driver 7, provides serial data output on the output line $67_2$ to a corresponding output data driver 7, provides serial data output on the output line $67_3$ to a corresponding output data driver 7, provides serial data output on the output line $67_4$ to a corresponding output data driver 7, and provides serial data output on the output line $67_5$ to a corresponding output data driver 7.

Thus, in various embodiments, the data on the output bus 48 from a corresponding memory block 40 that may have, for example, forty bit lines for providing 40 bits in parallel to the serializer 60 is converted by the serializer 60 into five serial data streams of 8 bits each for output on the output lines $67_1$, $67_2$, $67_3$, $67_4$, and $67_5$. Of course, the number of bit lines in the output bus 48 that are input to the serializer 60 and the number of output lines from the serializer 60 are merely provided as an example and, in various other embodiments, different numbers of bit lines and output lines can be used. In various embodiments, the serializer 60 is configured to receive parallel data input at a first frequency and to output that data as serial data at a second frequency that is higher than the first frequency. For example, parallel data may be input to the serializer 60 at a frequency of 100 MHz over the output bus 48, and the data may be output as serial data streams by the serializer 60 on the output lines 67$_1$, 67$_2$, 67$_3$, 67$_4$, and 67$_5$ at 800 MHz. Those numerical values are provided as examples and, in various other embodiments, different frequencies may be used and different numbers of stages may be employed for converting from parallel to serial data. For example, various other embodiments may pack 8 bit data input at 200 MHz into serial data output at 1.6 GHz using a set of clocks at 400 MHz, 800 MHz, and 1.6 GHz for three stages of multiplexers.

In various embodiments, each output data driver 7 takes the corresponding serial data stream from the serializer 60 and converts it into a transmission friendly format, such as by using differential signaling. In some embodiments, each output data driver 7 takes the corresponding serial data stream from the serializer 60 and converts it into a transmission according to the low-voltage differential signaling (LVDS) standard. In some embodiments, each output data driver 7 takes the corresponding serial data stream from the serializer 60 and converts it into a transmission according to the scalable low-voltage signaling (SLVS) standard. In various embodiments, each output data driver 7 includes an output pad for outputting the differential signaling transmission. With reference to FIGS. 1, 7, and 9, in various embodiments each of the output data drivers 70 includes one or more output data driver 7. In various embodiments, each output data driver 7 located to the top side of the pixel array 20 provides output from the top side of the image sensor 10 and each output data driver 7 located to the bottom side of the pixel array 20 provides output from the bottom side of the image sensor 10.

By having multiple phase-locked loops 50 on both the top side and bottom side of the image sensor 10 with respect to the pixel array 20 to provide clock signals to the multiple serializers 60, the architecture in accordance with various embodiments allows for implementing a high frequency data readout with a high precision synchronization of the serializers 60. The architecture in accordance with various embodiments also allows for a large pixel array size such as, for example, 20 mm×20 mm to achieve better sensitivity with large pixels and with high data framing. The architecture in accordance with various embodiments further provides for a massive parallel architecture with multiple data ports, to achieve a high output data throughput, and allows for increasing the frequency of the output data. Various embodiments allow for output data signaling at a greater frequency than with CMOS 1.8V-3.3V logic at 100 MHz, such as LVDS at 600 MHz or greater, or 1.6-3.5 GHz SLVS signaling.

When dealing with an image sensor having a large pixel array size, distribution of clocks over the image sensor becomes one of the biggest issues. For example, a 20 mm metal line of 1 µm width has the capacitance of 2 pF and the resistance of 2 kOhm, so a resulting signal or clock delay over the line may be 4 ns over one side of a chip. But, to synchronize all serializers at 5 GHz over the same distance may require, for example, the clock distribution accuracy of about 10 pico-second. Embodiments as disclosed above employ multiple phase-locked loops on both the top and bottom side of the pixel array so that the clock signals are able to be generated closer to the serializers than a case where a clock signal has to travel across a distance that is, for example, half of a length of a pixel array or greater. The multiple phase-locked loops on both the top and bottom side of the pixel array, therefore, allow for implementing high frequency data readout with high precision synchronization of the serializers while keeping a large pixel array size and allowing for a massive parallel architecture with multiple data ports to achieve high output data throughput.

Moreover, in various embodiments, the core of the image sensor except for some specific ADC implementations remains low-frequency to allow for time to access and read pixels in a large size pixel array, such as a 15 mm×15 mm pixel array, which is approximately 0.5-1 µs per pixel line address. In various embodiments, a higher frame rate is achieved by reading many rows at a time and using multiple ADCs per column of the pixels, and a higher output data rate is achieved with massive use of serializers, where the serializers may take, for example, 8 data bits at 200 MHz and pack the data into serial output at 1.6 GHz using a set of clocks at 400 MHz, 800 MHz, and 1.6 GHz. The multiple phase-locked loops on both the top and bottom side of the pixel array allow for a high precision synchronization of the serializers to permit the high frequency data readout. In various embodiments, a readout block may be a fully autonomous module which has memory, a serializer, output drivers, a phase-locked loop and a memory controller. In such embodiments, the dimension of the image sensor can be increased by adding more readout blocks to handle a larger pixel array.

Figure 10:
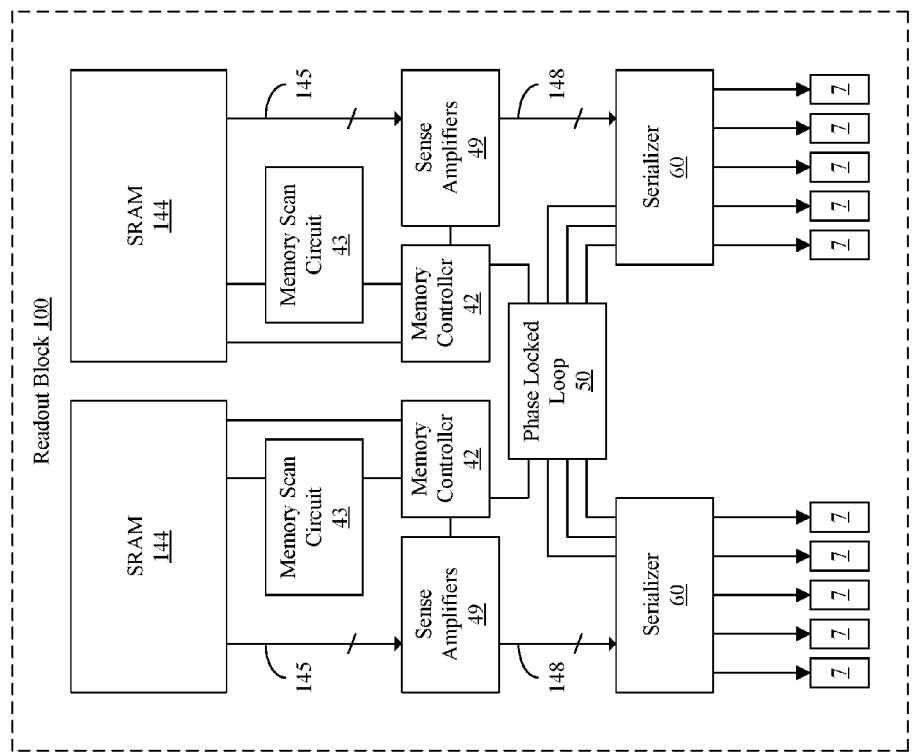
FIG. 10 shows a readout block in accordance with an embodiment.

FIG. 10 shows a block diagram of a layout for a readout block 100 in accordance with an embodiment. The readout block 100 includes static random access memories (SRAM) 144, readout buses 145, memory controllers 42, memory scan circuits 43, sense amplifiers 49, output buses 148, phase-locked loop 50, serializers 60, and output drivers 7. The readout block shown in FIG. 10 can be replicated multiple times on a top side of a pixel array and multiple times on a bottom side of a pixel array to allow for reading out of pixel data. Each SRAM 144 is configured to store digital pixel data converted from analog pixel signals output from a pixel array. The phase-locked loop 50 supplies clock signals to the memory controllers 42 and to the serializers 60. Each SRAM 144 and connected memory scan circuit 43, connected memory controller 42, and connected sense amplifiers 49 may constitute a memory block configured like the memory block 40 of FIG. 5.

With reference to FIG. 10, in various embodiments the phase-locked loop 50 supplies a clock signal to each of the memory controllers 42 that are each configured to control a corresponding memory scan circuit 43 and corresponding sense amplifiers 49 based at least partially on the clock signal to read out digital pixel data from a corresponding SRAM 144. The parallel data output from each of the sense amplifiers 49 is provided to a corresponding one of the serializers 60. The phase-locked loop 50 provides multiple clock signals of different frequencies to each of the corresponding serializers 60, and the serializers 60 are configured to convert the parallel data input from the corresponding sense amplifiers 49 to serial data output to be provided to a corresponding plurality of the output drivers 7 based at least partially on the multiple clock signals from the phase-locked loop 50. In various embodiments, each SRAM 144 may include, for example, two rows of 108 memory cells for storing data, and the corresponding memory scan circuit 43 provides signals to the SRAM 144 for reading out groups of the memory cells in an order. Each SRAM 144 is connectable to receive digital pixel data from a corresponding plurality of analog-to-digital conversion circuits.

The data read from each SRAM 144 is provided over the corresponding readout bus 145 to the corresponding sense amplifiers 49. The output from the sense amplifiers 49 is provided over the corresponding output bus 148 to the corresponding serializer 60. The readout buses 145 and the output buses 148 may have any desired number of bit lines. For example, in some embodiments, each of the readout buses 145 has forty bit lines and each of the output buses 148 has forty bit lines. In some such embodiments, each serializer 60 may include five units that each convert 8 bits received in parallel to a serial data stream of 8 bits, such that the forty bits received in parallel by the serializer 60 are converted by the serializer 60 to five serial data streams of 8 bits each. As another example, in some embodiments each of the readout buses 145 has twenty bit lines and each of the output buses 148 has twenty bit lines. In some such embodiments, each serializer 60 may include five units that each convert 4 bits received in parallel to a serial data stream of 4 bits, such that the twenty bits received in parallel by the serializer 60 are converted by the serializer 60 to five serial data streams of 4 bits each. While FIG. 10 shows five output drivers 7 connected to each serializer 60, it should be appreciated that any desired number of output drivers 7 may be used.

Figure 11A:
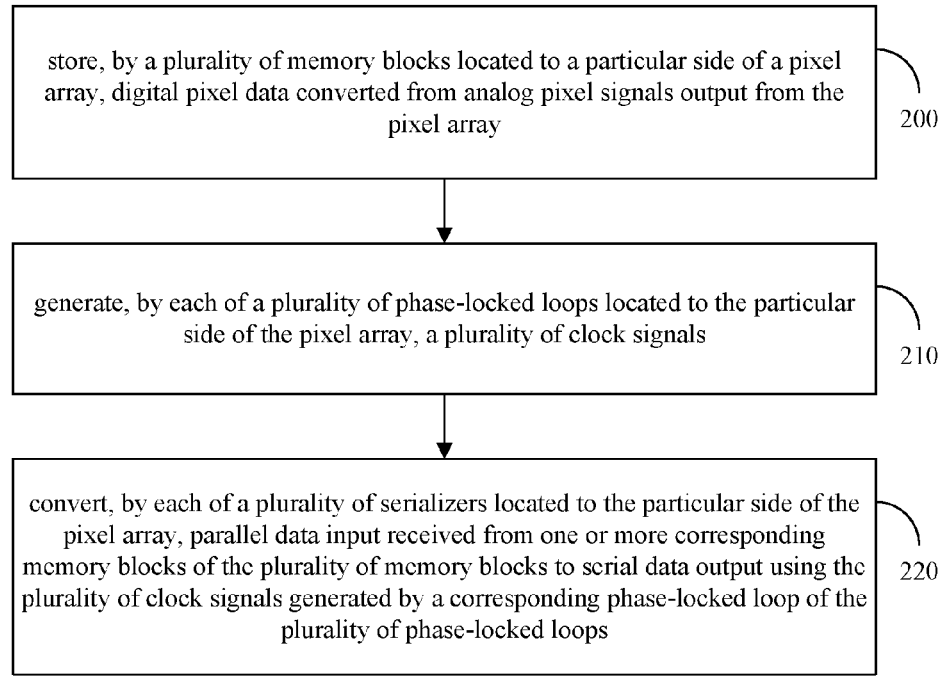
FIG. 11A shows a flowchart of a method in an image sensor in accordance with an embodiment.

FIG. 11A illustrates a method in an image sensor in accordance with an embodiment. In 200, a plurality of memory blocks located to a particular side of a pixel array store digital pixel data converted from analog pixel signals output from the pixel array. In 210, each of a plurality of phase-locked loops located to the particular side of the pixel array generate a plurality of clock signals. In 220, each of a plurality of serializers located to the particular side of the pixel array convert parallel data input received from one or more corresponding memory blocks of the plurality of memory blocks to serial data output using the plurality of clock signals generated by a corresponding phase-locked loop of the plurality of phase-locked loops.

In various embodiments, each of the plurality of serializers is connected to receive clock signals from a different phase-locked loop of the plurality of phase-locked loops than the other serializers of the plurality of serializers. In various embodiments, each phase-locked loop of the plurality of phase-locked loops receives a reference clock signal over a clock tree that provides for an equalized delay for the reference clock signal from a clock input pad to each of the plurality of phase-locked loops. In some embodiments, the generating of the clock signals includes generating, by each of the plurality of phase-locked loops located to the particular side of the pixel array, the plurality of clock signals based at least partially on a reference clock signal.

Figure 11B:
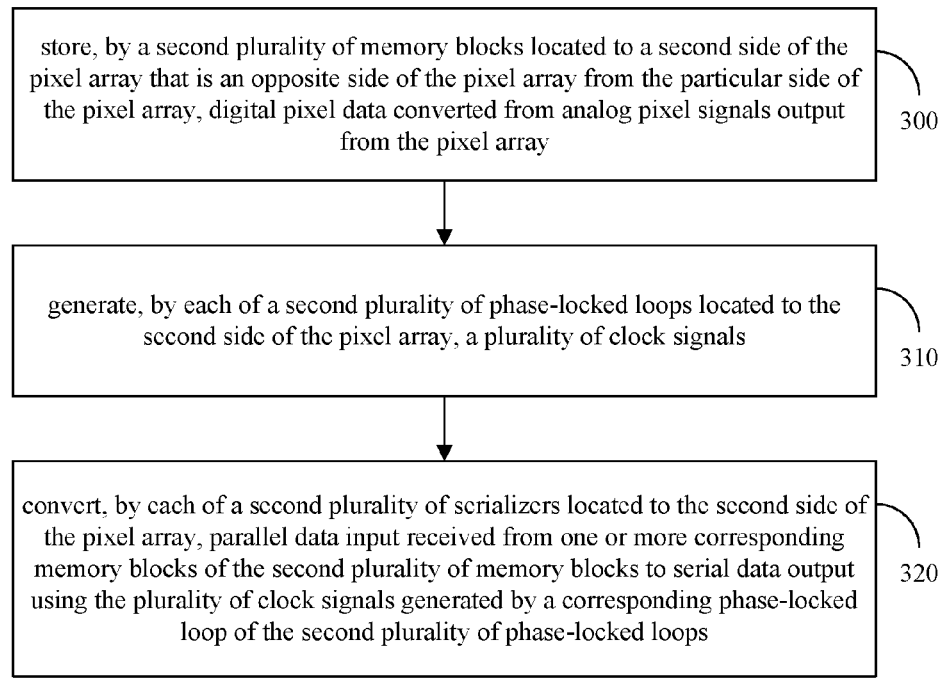
FIG. 11B shows a flowchart of a method in an image sensor in accordance with an embodiment.

FIG. 11B illustrates a method in an image sensor in accordance with an embodiment that may be performed, for example, at a same time that the method of FIG. 11A is performed. In 300, a second plurality of memory blocks located to a second side of the pixel array that is an opposite side of the pixel array from the particular side of the pixel array store digital pixel data converted from analog pixel signals output from the pixel array. In 310, each of a second plurality of phase-locked loops located to the second side of the pixel array generate a plurality of clock signals. In 320, each of a second plurality of serializers located to the second side of the pixel array convert parallel data input received from one or more corresponding memory blocks of the second plurality of memory blocks to serial data output using the plurality of clock signals generated by a corresponding phase-locked loop of the second plurality of phase-locked loops. In various embodiments, each phase-locked loop of the second plurality of phase-locked loops receives a reference clock signal over a clock tree that provides for an equalized delay for the reference clock signal from a clock input pad to each of the second plurality of phase-locked loops.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:

1. An image sensor, comprising:
   a pixel array comprising a plurality of pixels arranged in a plurality of rows and a plurality of columns;
   a plurality of memory blocks for storing digital pixel data converted from analog pixel signals output from the pixel array, the plurality of memory blocks located to a particular side of the pixel array;
   a plurality of phase-locked loops located to the particular side of the pixel array; and
   a plurality of serializers located to the particular side of the pixel array, each serializer of the plurality of serializers connected to receive parallel data input from one or more corresponding memory blocks of the plurality of memory blocks and configured to convert the parallel data input to serial data output using a corresponding plurality of clock signals from a corresponding phase-locked loop of the plurality of phase-locked loops.

2. The image sensor of claim 1, further comprising:
   a clock tree connected to two or more of the plurality of phase-locked loops and configured so as to provide for an equalized delay for a reference clock signal from a clock input pad to each of the two or more of the plurality of phase-locked loops.

3. The image sensor of claim 1,
   wherein each phase-locked loop of the plurality of phase-locked loops is configured to generate a respective plurality of clock signals based on a reference clock signal.

4. The image sensor of claim 3,
   wherein each phase-locked loop of the plurality of phase-locked loops is connected to provide the respective plurality of clock signals to a corresponding one or more of the serializers of the plurality of serializers as the corresponding plurality of clock signals for the corresponding one or more serializers.

5. The image sensor of claim 1,
   wherein each phase-locked loop of the plurality of phase-locked loops is connected to receive a reference clock signal as an input signal for the phase locked loop.

6. The image sensor of claim 1,
   wherein each phase-locked loop of the plurality of phase-locked loops is configured to generate a respective plurality of clock signals at different frequencies based at least partially on a reference clock signal.

7. The image sensor of claim 1,
   wherein each memory block of the plurality of memory blocks comprises a memory controller for generating one or more signals to control an output of the memory block; and
   wherein each phase-locked loop of the plurality of phase-locked loops is configured to generate a particular clock signal to provide to a corresponding memory controller of a corresponding memory block of the plurality of memory blocks.

8. The image sensor of claim 1,
wherein each memory block of the plurality of memory blocks is connected to provide output to a different serializer of the plurality of serializers than the other memory blocks of the plurality of memory blocks.

9. The image sensor of claim 1,
wherein each memory block of the plurality of memory blocks is connected to provide output to a corresponding serializer that is located closest to the memory block from among the plurality of serializers.

10. The image sensor of claim 1,
wherein each phase-locked loop of the plurality of phase-locked loops is connected to provide output to a different serializer of the plurality of serializers than the other phase-locked loops of the plurality of phase-locked loops.

11. The image sensor of claim 1, further comprising:
a plurality of output data drivers that are each connected to receive corresponding serial data output from a corresponding serializer of the plurality of serializers and configured to transmit the corresponding serial data output using differential signaling.

12. The image sensor of claim 1,
wherein each memory block of the plurality of memory blocks comprises:
a plurality of memory cells;
a plurality of bit lines, each bit line of the plurality of bit lines connected to one or more memory cells of the plurality of memory cells;
a plurality of sense amplifiers, each sense amplifier of the plurality of sense amplifiers connected to one or more bit lines of the plurality of bit lines; and
a memory scan circuit configured to cause data to be read out from memory cells of the plurality of memory cells over the plurality of bit lines to be output by the plurality of sense amplifiers.

13. The image sensor of claim 12,
wherein each serializer of the plurality of serializers is connected to receive output from corresponding sense amplifiers of the plurality of sense amplifiers of each of the one or more corresponding memory blocks of the plurality of memory blocks.

14. The image sensor of claim 1, further comprising:
a plurality of memory controllers, each memory controller of the plurality of memory controllers configured to control a corresponding memory scan circuit.

15. The image sensor of claim 14, further comprising:
a signal tree connected to each of the plurality of memory controllers and configured so as to provide for an equalized delay for an initialization signal from an input pad to each of the plurality of memory controllers.

16. The image sensor of claim 1, further comprising:
a second plurality of memory blocks for storing digital pixel data converted from analog pixel signals output from the pixel array, the second plurality of memory blocks located to a second side of the pixel array that is an opposite side of the pixel array from the particular side of the pixel array;
a second plurality of phase-locked loops located to the second side of the pixel array; and
a second plurality of serializers located to the second side of the pixel array, each serializer of the second plurality of serializers connected to receive parallel data input from one or more corresponding memory blocks of the second plurality of memory blocks and configured to convert the parallel data input to serial data output using a corresponding plurality of clock signals from a corresponding phase-locked loop of the second plurality of phase-locked loops.

17. The image sensor of claim 16, further comprising:
a clock tree connected to two or more of the second plurality of phase-locked loops and configured so as to provide for an equalized delay for a reference clock signal from a clock input pad to each of the two or more of the second plurality of phase-locked loops.

18. A method, comprising:
storing, by a plurality of memory blocks located to a particular side of a pixel array, digital pixel data converted from analog pixel signals output from the pixel array;
generating, by each of a plurality of phase-locked loops located to the particular side of the pixel array, a plurality of clock signals;
converting, by each of a plurality of serializers located to the particular side of the pixel array, parallel data input received from one or more corresponding memory blocks of the plurality of memory blocks to serial data output using the plurality of clock signals generated by a corresponding phase-locked loop of the plurality of phase-locked loops.

19. The method of claim 18,
wherein each of the plurality of serializers is connected to receive clock signals from a different phase-locked loop of the plurality of phase-locked loops than the other serializers of the plurality of serializers.

20. The method of claim 18,
wherein each phase-locked loop of the plurality of phase-locked loops receives a reference clock signal over a clock tree that provides for an equalized delay for the reference clock signal from a clock input pad to each of the plurality of phase-locked loops.

21. The method of claim 18,
wherein the generating comprises generating, by each of the plurality of phase-locked loops located to the particular side of the pixel array, the plurality of clock signals based at least partially on a reference clock signal.

22. The method of claim 18, further comprising:
storing, by a second plurality of memory blocks located to a second side of the pixel array that is an opposite side of the pixel array from the particular side of the pixel array, digital pixel data converted from analog pixel signals output from the pixel array;
generating, by each of a second plurality of phase-locked loops located to the second side of the pixel array, a plurality of clock signals;
converting, by each of a second plurality of serializers located to the second side of the pixel array, parallel data input received from one or more corresponding memory blocks of the second plurality of memory blocks to serial data output using the plurality of clock signals generated by a corresponding phase-locked loop of the second plurality of phase-locked loops.

23. The method of claim 22,
wherein each phase-locked loop of the second plurality of phase-locked loops receives a reference clock signal over a clock tree that provides for an equalized delay for the reference clock signal from a clock input pad to each of the second plurality of phase-locked loops.

* * * * *